(No Model.)
J. N. BODINE.
CLUTCHING MECHANISM.
No. 303,110. Patented Aug. 5, 1884.
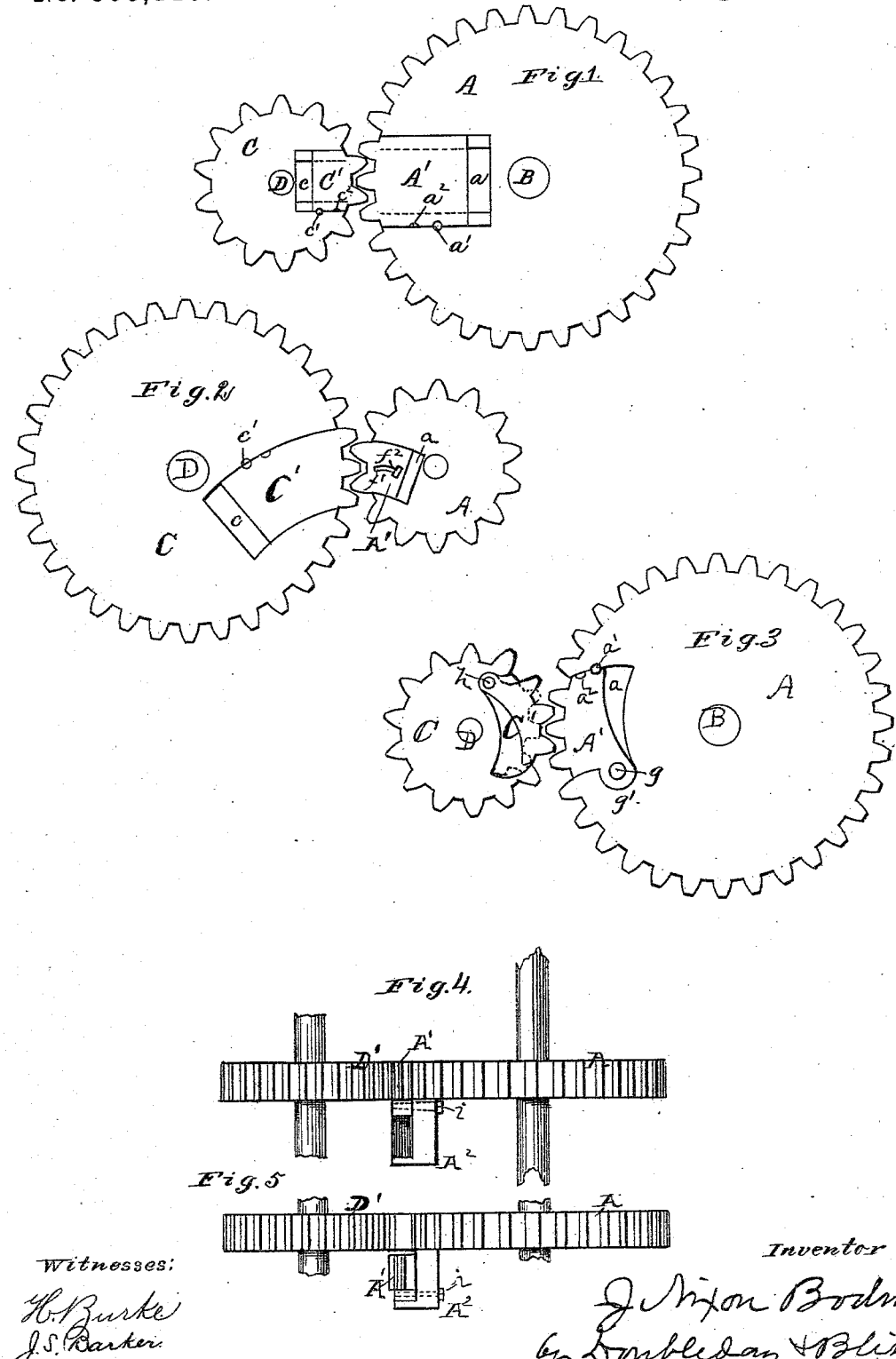
Witnesses:
H. Burke
J. S. Barker
Inventor
J. Nixon Bodine
by Doubleday & Bliss
attys.

United States Patent Office.

J. NIXON BODINE, OF BRIDGETON, NEW JERSEY.

CLUTCHING MECHANISM.

SPECIFICATION forming part of Letters Patent No. 303,110, dated August 5, 1884.

Application filed April 10, 1884. (No model.)

*To all whom it may concern:*

Be it known that I, J. NIXON BODINE, a citizen of the United States, residing at Bridgeton, in the county of Cumberland and State of New Jersey, have invented certain new and useful Improvements in Clutching Mechanism, of which the following is a specification, reference being had therein to the accompanying drawings.

Figure 1 is a side elevation of my invention. Fig. 2 is a side elevation showing a modification. Figs. 3, 4, and 5 show other modifications, Fig. 5 being a plan or top view, partly broken away, of Fig. 4, showing the section of teeth of one of the gears moved out of the path of rotation of the other gear.

Referring to the drawings, A A' is a spur-gear keyed to shaft B, which is supported in bearings of any usual or approved construction, so as to rotate therein, the shaft and gear having a rotary motion imparted to them from any desired motor. The section A' of the wheel, having a portion of the cogs attached to its outer end, is seated in a recess, slot, or throat, $a$, formed in the section A of the wheel. The sides of the section A' may be constructed with V-shaped grooves to fit corresponding ribs formed upon the adjacent walls of the slot or recess $a$, so that the section A' may slide toward and from the periphery of the wheel. The two sections may be locked in the position shown in the drawings by means of a key, $a'$, which is secured in seats or holes formed partly in each of the sections, this key being provided at one end with a head and at its opposite end with a thread and nut to facilitate holding it firmly in place. By taking out the key and sliding the section A' inward a short distance the semicircular seat $a^2$ will register with the semicircular seat formed in the section A of the wheel, when the key $a'$ can again be inserted, whereby the section A' will be locked in its innermost position. C C' is a similar gear-wheel, but of less diameter, mounted upon a central shaft, D. The sliding section C' of this wheel may be moved toward and from the wheel A A' and locked in either position by means of a key, $c'$, and key-seats.

From the above it will be readily seen that one of the movable sections may be moved toward the center of the wheel, and its teeth thereby withdrawn from the path of rotation of the other teeth upon the periphery of the wheel, so that the opposite wheel of the pair can rotate without driving the wheel of which the movable section has thus been moved inwardly. The sliding section C' can be moved outward so that its teeth shall again occupy their place and traverse the path of rotation of the periphery of the non-sliding section, care being taken to make this latter adjustment of parts at a time when the teeth of the sliding section can be made to mesh properly with the teeth of the wheel A A', after which the continuous rotation of one wheel will cause a continuous rotation of the other wheel of the pair.

In Fig. 2 I have shown a modification in which the slots $a$ and $c$ are formed in arcs of circles, and in which also the driving-wheel A' is smaller than the wheel C C', and in this modification the sliding section A' is locked in position by means of a bolt, $f^2$, passing through a slot, $f'$, in the sliding section. In this wheel the recess for the sliding section is not cut entirely through the non-sliding section at that part where the bolt is located, in order that a threaded hole for the bolt may be formed in one wall of the recess.

One advantage arising from the construction of parts shown in Fig. 2 is this: The inward thrust upon the sliding section—that is, the thrust toward the center of the wheel which is produced by the meshing of the teeth—is supported in part by the wall of the slot or recess, so that less strain is imposed upon the locking devices.

In the construction shown in Fig. 3 the section A is provided with a recess, into which the section A' can be swung about a pivot, $g$, when it is desired to withdraw the teeth of this swinging section from the path of rotation of the teeth of the section A.

As indicated in the drawings, the pivoting is effected by providing a swinging portion with a lug, $g'$, of about half the thickness of the adjacent portion of the wheel, this lug being seated in the recess formed for its reception in the section A, where it is confined by means of the pivot $g$, about which it vibrates; or the part A may have two lugs between which the part A' is pivoted. In this construction the swinging section may be locked into its different positions by means of a key and key-seats formed partly in the swinging section and partly in the non-swinging section. The corresponding gear C C' is similarly constructed, whereby either of the pair of wheels may have a toothed section withdrawn toward its center, so that such wheel will stand still while its driver continues to rotate, as is indicated in dotted lines, by examining which it will be seen that the wheel A A' can rotate without engaging with the teeth of the swinging section C'.

In Fig. 4 the section A is provided with a laterally projecting flange, I', having walls I², which project at right angles from the flange I', thus constituting a sort of boxing or chamber into which the sliding section A' can be moved so as to permit the driving-gear C C' to rotate continously without moving the gear A A', it being of course understood that the periphery of the section A is recessed on lines corresponding to the inner surface of the walls or flanges I' I², and that the sliding section A' fits closely within these walls. One advantage which is due to this construction is that it provides an unyielding support for the thrust upon the sliding section in all directions in which that thrust is exerted when the wheels are rotated. For instance, the side walls and the sides of the recesses in the periphery or rim of the section A support the sliding section against the thrust in the direction of its rotation, and the base or bottom of the boxing which is formed by the flange I', together with the corresponding wall of the recess in the body of the gear, supports the section A' against the thrust which is exerted upon it by the meshing of the gears, and which tends to push it inward toward the center of the gear.

As indicated in dotted lines, Fig. 4, the set-screw or bolt $i$, which moves in a slot in the flange I', and is seated at its threaded end in the threaded hole of the sliding part A', may be used to secure said sliding section in the various positions to which it is adjusted, as is indicated in Figs. 4 and 5.

In all of the gears shown and described the construction of parts is such that a tooth-carrying section of a gear may be removed from the path of rotation of the teeth of the non-sliding section, and thus the wheel—one section of which is thus moved—will stand still, though the opposing wheel of the pair continues its rotation, from the fact that in consequence of this change of position of the sliding section its teeth are withdrawn from mesh with the teeth of the continuously-rotating opposite wheel of the pair.

It will of course be understood that this invention is not limited in its application to spur-gearing, but is equally applicable to bevel, friction, and other forms of cogged or toothed wheels of such modification of parts only as are necessary to provide for the withdrawal of a portion of the periphery from their working relation to other parts of the periphery of the same wheel. Nor do I wish to be limited to the specific construction of parts which I have shown to permit the withdrawal of a portion of the teeth from their position, because many modifications of the parts might be made, and would suggest themselves to an ordinary skilled mechanic, without departing from the spirit of my invention; but I have shown and described forms which seem to me to be best adapted for the carrying out of my improvement. Of course one of the gears might be provided with two or more movable sections capable of being withdrawn from the engaging-wheel, so that by withdrawing such sections an intermittent rotating motion might be produced in such manner that the driven wheel shall pause a number of times before making a complete revolution. Of course under many circumstances it will be desirable to provide these gears with means to insure that the teeth shall mesh properly, as is done with many of the forms of "broken" or "mutilated" gears which are in common use, but which need not be specifically described herein. I propose, in working my invention, to withdraw these movable sections in either the driven or driving wheel, as the requirements of the work to be done shall indicate.

Under many circumstances it will be found desirable to employ means for withdrawing one or more of these movable sections of the wheel while the wheel of which they form parts is in rotation, in which case I propose to employ devices carried by the shaft of such wheel, and connected with the movable section or sections in such manner as to accomplish this result.

With some or all of the constructions shown I propose to employ locking-springs, under such a construction and arrangement of parts that the movable sections shall be held either in position for meshing, or out of such position by the frictional engagement of the springs, particularly when the gear is to be constructed with appliances for shifting the positions of these movable sections without stopping the rotation of the gear.

I do not in this case desire to claim any invention except such as are specifically recited in the claims hereof, reserving to myself the right to claim all other patentable features shown or described in another application which I am about to file.

What I claim is—

1. A gear-wheel made in sections fitting each other closely at their edges, so as to form a practically-continuous periphery, and of which one is adapted to be moved out of the path of rotation of the other section without being removed from contact therewith, substantially as set forth.

2. A gear-wheel made in sections, of which one is adapted to be moved out of the path of rotation of the other section, in combination with locking devices, substantially as described and carried by the wheel, for securing the movable section in different positions, substantially as set forth.

3. A gear-wheel which is provided upon its periphery with a recess, a section constituting part of the periphery of the wheel and seated in the recess and adapted to be moved inwardly toward the center of the wheel, substantially as described, so as to withdraw the portion of the periphery from the path of rotation of the periphery of the other section of the wheel, substantially as set forth.

4. A gear-wheel made in sections A A', forming a practically-continuous periphery, and provided with key-seats, in combination with the key $a'$, substantially as set forth.

5. The combination of two gear-wheels meshing with each other, and each made in two sections, one of which is adapted to be moved out of the path of rotation of the other section, substantially as described.

In testimony whereof I affix my signature in presence of two witnesses.

J. NIXON BODINE.

Witnesses:
  I. BOYD NIXON,
  JOHN M. LANING.